(12) United States Patent
Loesch

(10) Patent No.: US 12,089,779 B2
(45) Date of Patent: Sep. 17, 2024

(54) ROTATABLE GRILLER FOR BARBECUES

(71) Applicant: Bruce Loesch, Brentwood, CA (US)

(72) Inventor: Bruce Loesch, Brentwood, CA (US)

(*) Notice: Subject to any disclaimer, the term of this patent is extended or adjusted under 35 U.S.C. 154(b) by 0 days.

(21) Appl. No.: 16/350,130

(22) Filed: Oct. 2, 2018

(65) Prior Publication Data
US 2020/0113384 A1 Apr. 16, 2020

(51) Int. Cl.
*A47J 37/07* (2006.01)
*A47J 37/04* (2006.01)

(52) U.S. Cl.
CPC ......... *A47J 37/0786* (2013.01); *A47J 37/049* (2013.01)

(58) Field of Classification Search
CPC .... A47J 37/049; A47J 37/0786; A47J 37/041; A47J 37/043; A47J 37/047
USPC .......................................................... 99/450
See application file for complete search history.

(56) References Cited

U.S. PATENT DOCUMENTS

| | | | | |
|---|---|---|---|---|
| 171,032 A * | 12/1875 | Meyers | ................ | A47J 45/071 220/759 |
| 695,096 A * | 3/1902 | Faivre | ................ | A47J 37/0694 99/402 |
| 1,022,978 A * | 4/1912 | Stevens | ................ | A47J 45/071 220/759 |
| 1,786,345 A * | 12/1930 | Itzi | ...................... | A47J 37/0676 99/398 |
| 1,976,989 A * | 10/1934 | Grimes | ................ | A47J 37/041 99/346 |
| 2,023,521 A * | 12/1935 | Furnas | .................... | A47J 45/10 294/33 |
| 2,089,315 A * | 8/1937 | Wheeler | ................ | A47J 37/08 99/340 |
| 2,281,015 A * | 4/1942 | Weise | .................... | A47J 45/10 294/33 |
| 2,376,640 A * | 5/1945 | Wall | ..................... | A47J 37/0694 99/426 |
| 2,839,989 A * | 6/1958 | Persinger | ............. | A47J 37/049 99/421 R |
| 2,983,218 A * | 5/1961 | Persinger | ............. | A47J 37/049 99/427 |
| 3,025,782 A * | 3/1962 | Stall | ........................ | F24B 1/207 99/339 |
| 3,051,075 A * | 8/1962 | Watts | .................... | A47J 37/049 99/397 |
| 3,091,170 A * | 5/1963 | Wilson | ................ | A47J 37/0718 99/390 |

(Continued)

*Primary Examiner* — Eric S Stapleton
(74) *Attorney, Agent, or Firm* — Mark C Jacobs

(57) ABSTRACT

A griller for use on a barbecue which has a food retainer that has a top section hinged to a bottom section, the top section being releasably unlatchable to the bottom section to keep the food retainer selectively closed. A frame with a handle is pivotally attached to the food retainer, The latching mechanism, includes a rod that passes through the handle and frame to activate a latch that keeps the food retainer closed, and when the latching mechanism is activated, the two portions of the griller are separated and the contents become accessible. The rod is spring loaded to return it to a position within the confines of the food retainer when needed. The griller is designed to be carried from location to location with the food retainer vertical when latched, as well as with the food retainer a horizontal disposition also with the retainer latched.

10 Claims, 15 Drawing Sheets

(56) References Cited

U.S. PATENT DOCUMENTS

| | | | | |
|---|---|---|---|---|
| 3,188,939 A * | 6/1965 | Smith | A47J 37/041 | 99/393 |
| 3,207,059 A * | 9/1965 | Hirons | A47J 37/0694 | 99/349 |
| 3,359,889 A * | 12/1967 | Young | A47J 37/049 | 99/426 |
| 3,373,678 A * | 3/1968 | Miller | A47J 37/0688 | 99/389 |
| 3,559,565 A * | 2/1971 | Getz | A47J 37/0704 | 99/340 |
| 3,566,777 A * | 3/1971 | Koziol | A47J 37/049 | 99/427 |
| 3,585,922 A * | 6/1971 | Peterson | A47J 43/18 | 99/355 |
| 3,704,141 A * | 11/1972 | Grossman | A47J 37/067 | 99/397 |
| 3,848,522 A * | 11/1974 | Trelc | A47J 37/041 | 99/421 H |
| 4,189,993 A * | 2/1980 | Kaufman | A47J 37/1295 | 126/214 D |
| 4,192,283 A * | 3/1980 | Kridler | A47J 37/0786 | 126/220 |
| 4,211,206 A * | 7/1980 | Darbo | A47J 37/0763 | 126/25 R |
| 4,331,123 A * | 5/1982 | Alles | A47J 37/0786 | 108/152 |
| 4,442,762 A * | 4/1984 | Beller | A47J 37/0704 | 99/340 |
| 4,442,763 A * | 4/1984 | Beller | A47J 37/0745 | 126/9 B |
| 4,452,131 A * | 6/1984 | Gaskins | A47J 37/0694 | 16/426 |
| 4,492,152 A * | 1/1985 | DeSantis | A47J 37/0694 | 99/397 |
| 4,509,682 A * | 4/1985 | Heiman | A01M 17/008 | 239/120 |
| 4,944,282 A * | 7/1990 | Aguiar | A47J 37/049 | 126/25 AA |
| 5,048,882 A * | 9/1991 | Fielding | A47J 37/0694 | 16/425 |
| 5,134,927 A * | 8/1992 | McCarthy, III | A47J 37/047 | 126/21 A |
| 5,365,834 A * | 11/1994 | Sidoti | A47J 37/0694 | 99/343 |
| 5,497,697 A * | 3/1996 | Promny | A47J 37/047 | 99/394 |
| 5,590,584 A * | 1/1997 | Ahn | A47J 37/047 | 219/521 |
| 5,660,101 A * | 8/1997 | Cirigliano | A47J 37/047 | 126/25 A |
| 5,704,279 A * | 1/1998 | Fabrikant | A47J 37/0694 | 99/394 |
| 5,782,224 A * | 7/1998 | Rabell | A47J 37/049 | 126/25 R |
| 5,884,554 A * | 3/1999 | Sprick | A47J 37/041 | 126/25 A |
| 5,906,152 A * | 5/1999 | Alcorn | A47J 37/0786 | 99/399 |
| 6,119,584 A * | 9/2000 | Hsu | A47J 37/042 | 219/400 |
| 6,173,645 B1 * | 1/2001 | Backus | A47J 37/041 | 220/326 |
| 6,272,975 B1 * | 8/2001 | Usherovich | A47J 37/047 | 99/331 |
| 6,276,023 B1 * | 8/2001 | Grundy | A47J 37/0786 | 15/118 |
| 6,367,373 B2 * | 4/2002 | Bargman | A47J 37/0694 | 99/419 |
| 6,515,262 B1 * | 2/2003 | Li | A47J 27/004 | 219/429 |
| 6,526,876 B2 * | 3/2003 | Kahler | A47J 37/0694 | 16/110.1 |
| 7,159,510 B2 * | 1/2007 | LaMaster | A23B 4/031 | 99/349 |
| 7,234,392 B1 * | 6/2007 | Arndt | A47J 37/049 | 99/419 |
| 7,514,651 B2 * | 4/2009 | Popeil | A47J 37/042 | 219/392 |
| D609,525 S * | 2/2010 | Rabanal | D7/409 | |
| D614,003 S * | 4/2010 | Zemel | D7/686 | |
| 7,717,029 B2 * | 5/2010 | Rowe | A47J 37/067 | 99/394 |
| 7,775,156 B2 * | 8/2010 | Sus | A47J 37/1295 | 99/410 |
| 7,793,389 B1 * | 9/2010 | Michnik | A47J 45/072 | 16/422 |
| 7,841,270 B2 * | 11/2010 | Holbrook | A47J 37/0786 | 99/395 |
| 8,037,812 B1 * | 10/2011 | Sumner, Sr. | A47J 37/1295 | 220/494 |
| 8,584,579 B1 * | 11/2013 | Sumner, Sr. | A47J 37/1295 | 220/494 |
| 8,656,829 B2 * | 2/2014 | Ciaciura | A47J 37/0694 | 99/395 |
| 8,656,903 B1 * | 2/2014 | Branton | A47J 37/049 | 126/25 R |
| 8,776,774 B2 * | 7/2014 | Hsu | A47J 37/041 | 126/25 AA |
| 8,899,145 B2 * | 12/2014 | Harrison | A47J 37/067 | 294/10 |
| 9,155,422 B1 * | 10/2015 | Wohld | A47J 43/18 | |
| 9,247,849 B1 * | 2/2016 | Howes | A47J 37/041 | |
| D756,704 S * | 5/2016 | Johansson | D7/409 | |
| 9,332,878 B1 * | 5/2016 | Green | A47J 37/049 | |
| D771,994 S * | 11/2016 | Zemel | D7/338 | |
| 9,565,973 B2 * | 2/2017 | Paul | A47J 45/10 | |
| 9,801,365 B2 * | 10/2017 | Constantine | B25B 9/02 | |
| 9,848,730 B2 * | 12/2017 | Holzapfel | F24C 15/16 | |
| 10,334,988 B2 * | 7/2019 | Davis | A47G 23/0641 | |
| 10,440,968 B2 * | 10/2019 | Bowyer | A47J 37/0786 | |
| 2004/0031478 A1 * | 2/2004 | Gifford | A47J 37/0704 | 126/25 AA |
| 2007/0214968 A1 * | 9/2007 | Larson | A47J 37/1295 | 99/403 |
| 2008/0028951 A1 * | 2/2008 | Margaret | A47J 19/04 | 99/537 |
| 2008/0034980 A1 * | 2/2008 | Nardone | A47J 37/041 | 99/419 |
| 2008/0078374 A1 * | 4/2008 | Polkinghorn | A47J 37/0786 | 126/194 |
| 2008/0124438 A1 * | 5/2008 | Forte | A47J 37/1295 | 426/389 |
| 2008/0149578 A1 * | 6/2008 | Scharf | A47J 37/0786 | 211/86.01 |
| 2011/0097468 A1 * | 4/2011 | Driscoll | A47J 37/0786 | 426/519 |
| 2011/0174163 A1 * | 7/2011 | Jenniges | A23L 7/187 | 99/323.5 |
| 2011/0174165 A1 * | 7/2011 | Todorovic | A47J 43/18 | 99/426 |
| 2011/0311314 A1 * | 12/2011 | Taylor | E02D 29/0225 | 405/259.1 |
| 2011/0311317 A1 * | 12/2011 | Taylor | E02D 29/0241 | 405/273 |
| 2011/0311318 A1 * | 12/2011 | Taylor | E02D 29/0225 | 405/284 |
| 2012/0224926 A1 * | 9/2012 | Taylor | E02D 29/0241 | 405/272 |
| 2012/0224927 A1 * | 9/2012 | Taylor | E02D 29/02 | 405/302.4 |
| 2012/0266760 A1 * | 10/2012 | Bryce | A47J 33/00 | 99/448 |
| 2014/0220212 A1 * | 8/2014 | Scotto | A47J 37/0704 | 426/523 |
| 2016/0374511 A1 * | 12/2016 | Rosecrans | A47J 37/0786 | 126/215 |
| 2017/0014000 A1 * | 1/2017 | Minnich | F24B 3/00 | |

(56) References Cited

U.S. PATENT DOCUMENTS

2017/0065125 A1* 3/2017 Hong .................. A47J 37/0704
2018/0140135 A1* 5/2018 Balfantz, III ....... A47J 37/0786
2018/0360266 A1* 12/2018 Lee ....................... A47J 37/044

* cited by examiner

ROTATABLE GRILLER FOR BARBECUES

FIELD OF THE INVENTION

This invention pertains to the field of utensils for the retention of meat and vegetables for cooking on a barbecue that utilizes charcoal or gas as the cooking medium.

BACKGROUND OF THE INVENTION

Mankind has been cooking meats and vegetables since the days of the caveman. Paintings and drawings show George Washington's men cooking dinner over a wood fire at Valley Forge and other battle locations during the US revolutionary War. After World War 2, families everywhere began to barbecue in their back yards on charcoal grills. Today many folks use gas as the cooking medium, either propane in a can obtained at the Big Box store or gas station or they have a direct connection by pipe to feed natural gas to the barbecue for cooking. I At first people put their meats and veggies directly on the grill grates. Often times, hot dogs would fall through the wire spacings on the grid over the coals, or burger pieces would break off and get lost in the fire or vegetables would have to be cut into large segments to also avoid being lost. In addition, round in cross section items such as sausages could not be easily rotated to ensure even cooking. So folks turned to tools to retain their meats and vegetables over the coals or burning gas in an effort to achieve uniform cooking.

DeSantis in U.S. Pat. No. 4,492,152 discloses a rotatable barbecuing device which is quite complicated to operate in that it has three handles to be manipulated.

A barbecuing basket with a removable handle is shown in the patent of Fielding et al, U.S. Pat. No. 5,048,882. This unit has spaced bars that run in only one direction, and as such small items could fall between the bars and be lost to the fire.

A round in cross section tumbler basket suitable for chicken parts or french fries is disclosed in Promny U.S. Pat. No. 5,497,697.

A flippable griller pan is disclosed in the patent of Ciarcuia U.S. Pat. No. 8,656,829. This device has a basket formed of a pair of spaced circular metal members that are connected by upstanding spaced rods. A pair of hooked implements grab the basket and flip it over. Of course, there is always the risk that one could drop the basket on the ground in the process of turning it over.

Even Cuisanart® has a grill basket with a long handle on it for cooking fish, seafood and chicken.

While these and other cooking implements will work for the home barbecuer, most of them have a problem in achieving even cooking on both sides of the chicken meat or fish. Thus applicant's device called the Griller 360 was born. It basically comprises an operable basket closed by a hinged panel, a pair of axles for rotation of the grill basket from obverse to reverse side, and of course a handle that is insulated to keep the handle cool and comfortable during the cooking process.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A griller for use on a barbecue having a food retainer that has a top section hinged to a bottom section, the top section being latchable to the bottom section to keep the food retainer selectively closed. A frame with a handle is pivotally attached to the food retainer, The latching mechanism, includes a three position rod that passes through the handle and frame to release a latch that keeps the food retainer closed, and when the latching mechanism is released, the two portions of the griller are separated and the contents become accessible. The griller is designed to be carried from location to location with the food retainer vertical when latched, as well as with the food retainer latched but in a horizontal disposition.

DESCRIPTION OF THE PREFERRED EMBODIMENT

Figure 1:
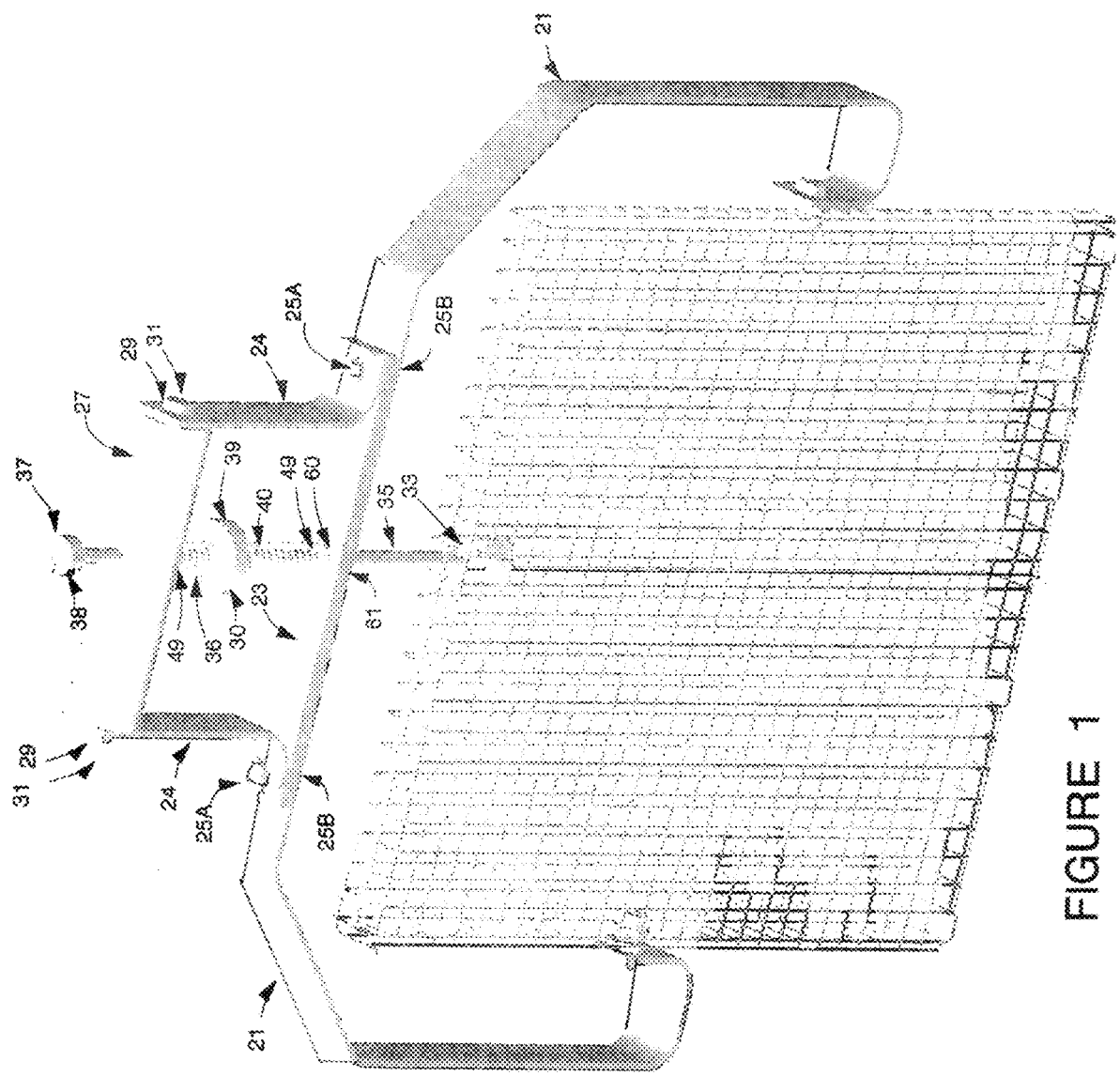
FIG. 1 is a top front perspective view of the device of this invention.

Let us first turn to FIG. 1, which is a front perspective view of the device 10, of this invention. The invention broadly comprises a food retainer also referred to as a hardware cloth basket designated 11, and which has two parts a top 13 and a bottom 15. The bottom has four upstanding sides, while the top is generally flat and has a downward extending front edge.

The food retainer 11 is mounted within a frame, 21, more about which is set forth infra. The frame 21 is mounted to the food retainer 11 such that the food retainer can freely rotate 360 degrees by a retainer attachment assembly (RAA) 43. Also attached to the frame is an insulation member 23 and a pair of mirror image opposed J shaped members 24. A handle 27 connects and is disposed between the 2 opposed J shaped members. An unlatching assembly comprising a rod 35 with spaced collars thereon is disposed through both the handle and the insulator to release the two portions of the food retainer from a closed relationship. Now for the details.

Figure 7:
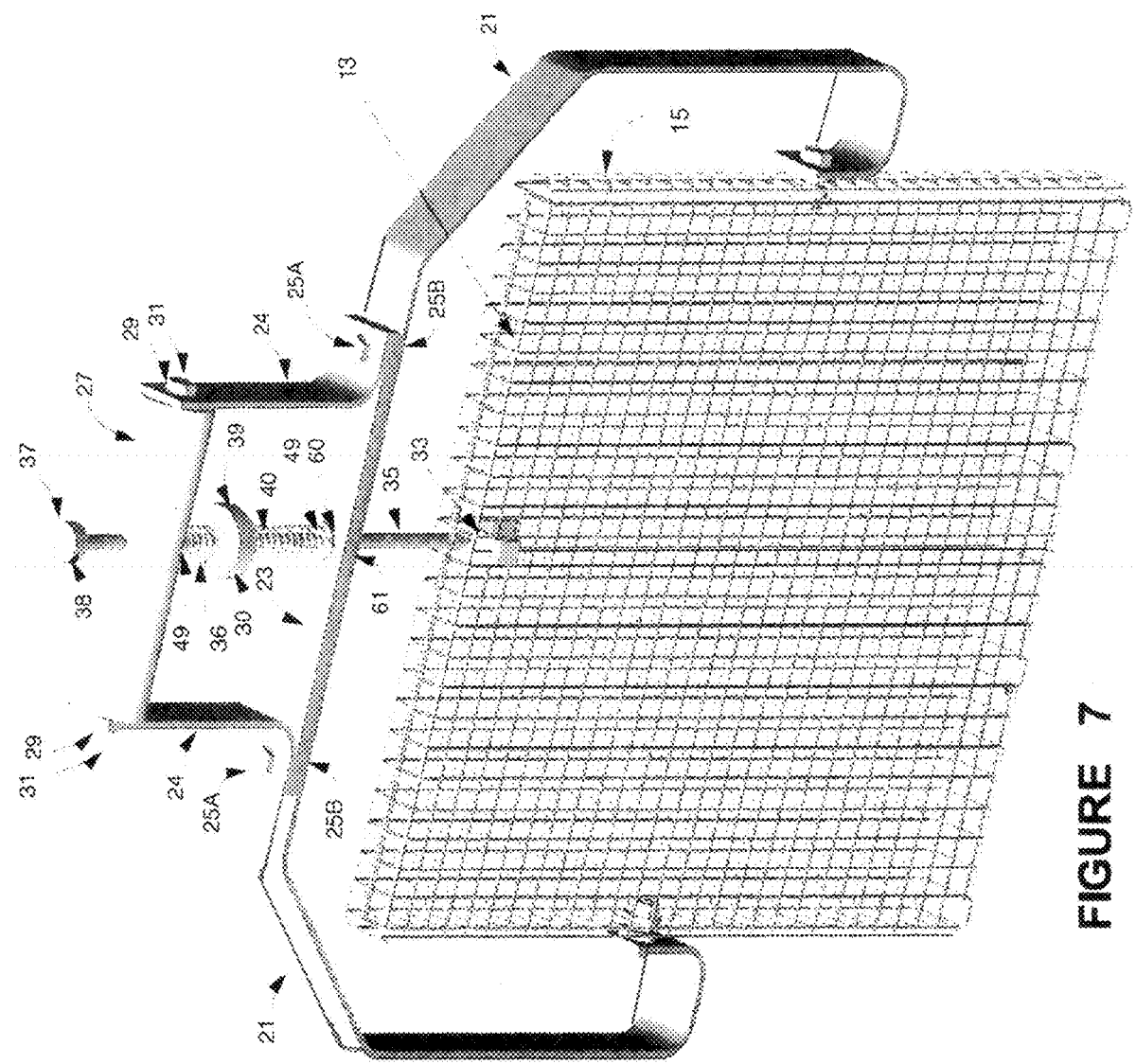
FIG. 7 is a closeup view of the food retainer locking mechanism and carrying handle.

Skipping momentarily over the details of the food retainer 13, we find that the food retainer is held in position by a frame to food retainer attachment assembly 43. Details on this portion of the invention are seen in FIG. 7 and discussed in the text infra.

Figure 14:
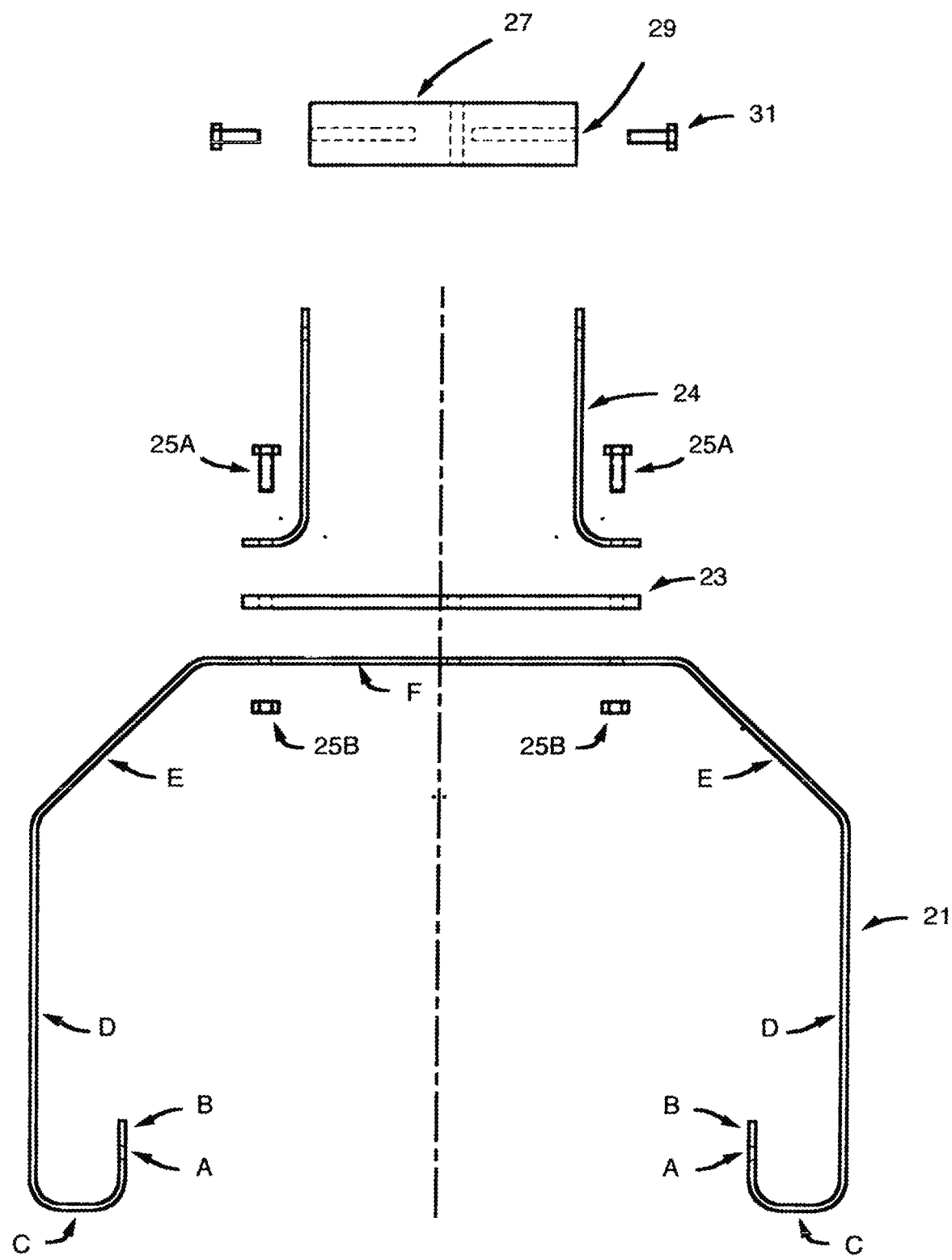
FIG. 14 is an exploded view of the handle and carrying frame.

The frame 21 has a plurality of segments all integrally connected. Reference is made to FIG. 14 for a complete description of the frame elements. See infra.

Figure 2:
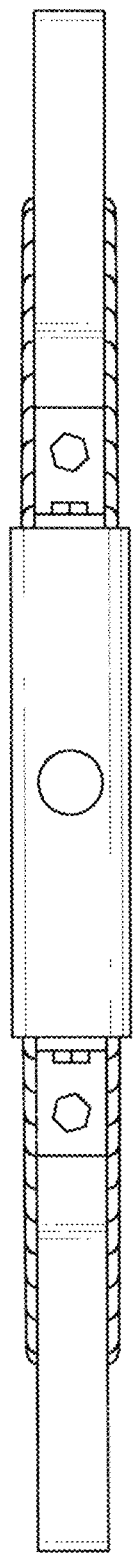
FIG. 2 is a left side perspective view of the device of this invention. The right side view is a mirror image thereof.
Figure 3:
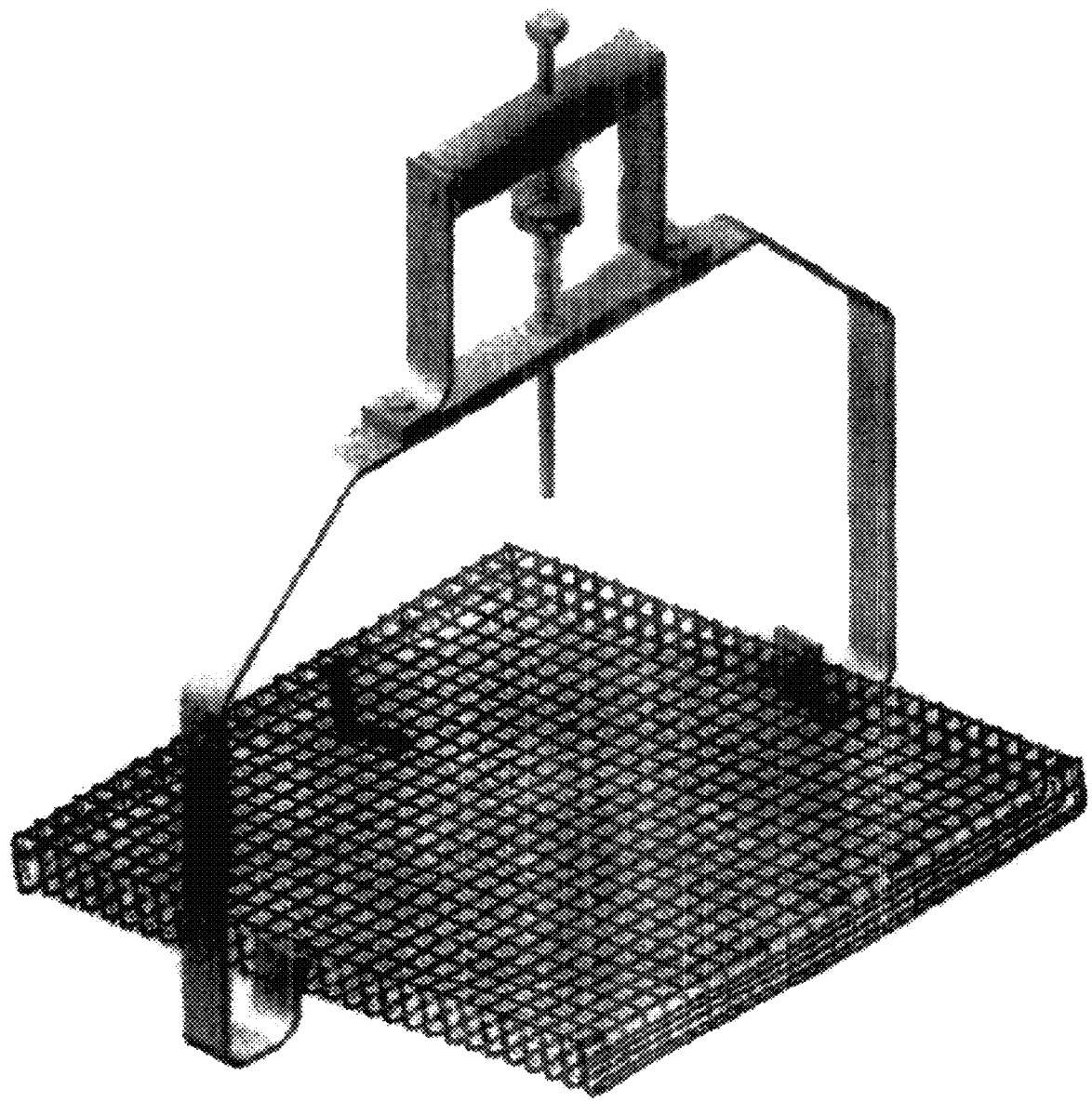
FIG. 3 is a perspective view of the griller with the basket in a generally horizontal position.
Figure 4:
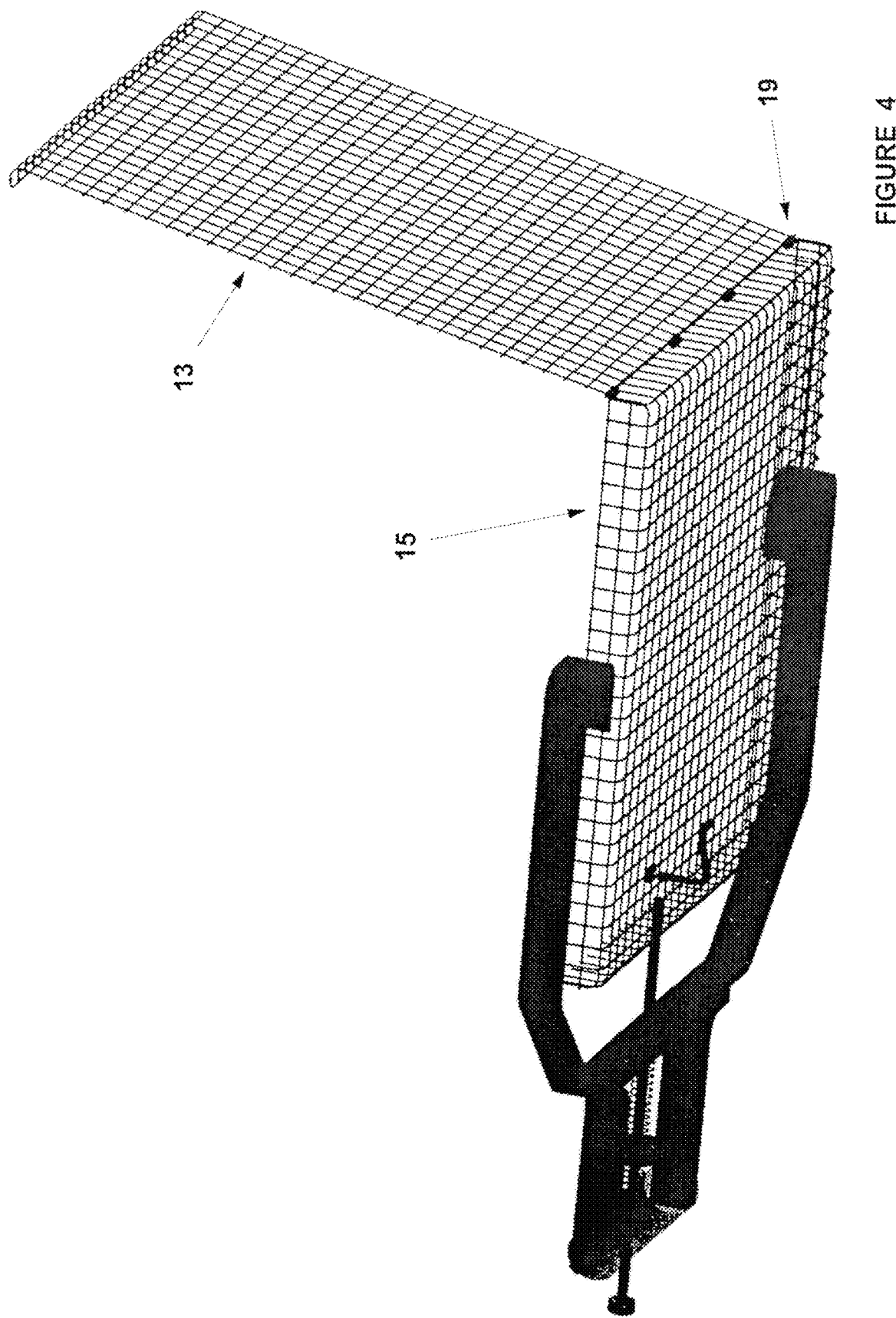
FIG. 4 is a top perspective view of this device with the food retainer open to best illustrate the top and bottom portions thereof.

Let us turn now to FIGS. 2, 3 and 4. FIG. 2 is a side view of this device with the front and rear of the food retainer being slightly canted from being in line with the handle. FIG. 3 on the other hand is a view where the top of the food retainer (basket) faces the handle and the bottom of the food retainer faces the ground.

Figure 8:
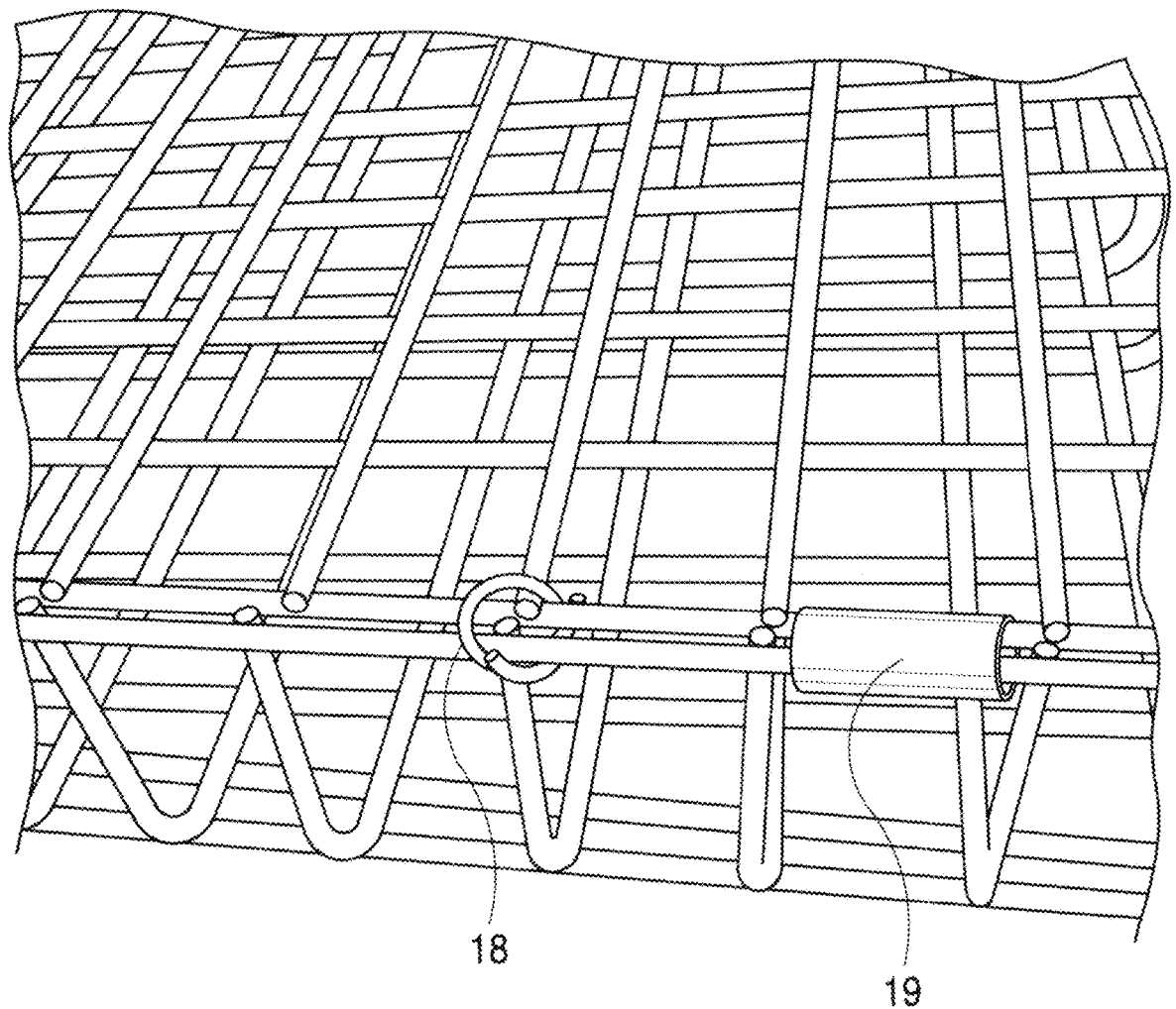
FIG. 8 is a closeup view of one of several slack prevention members.

The food retainer is a two part unit seen best in FIG. 4, which has a top portion 13 and a bottom portion 15. These two are held to each other by a series of hinge members, one of which designated 19 is seen in FIG. 8. The top portion and bottom portion are both constructed of ½ inch opening hardware cloth that has been bent to a desired shape. The top portion has a flat rectangular or square first section 13A with a downwardly extending front lip 13B that is directed to overlie the bottom portion 15, specifically section (wall) 15C. The bottom portion 15 has a flat rectangular or square main section 15A, and four upstanding sections front 15C, back 15E and two sides 15B and 15 D normal to the front and back. The 4 upstanding sections all extend upward a uniform distance about 1.0 inches. Both the top portion and the bottom portion are formed from flat hardware cloth that is bent on a break to the desired size. In the bottom portion, the 4 upstanding sections are not connected to one another but can be, if so desired by wire connectors, or by a food grade series of welds. Recommended width is about 12.5 inches, and length of about 14.5 inches and thickness of 1 inch to 2 inches for the food retainer.

Figure 5:
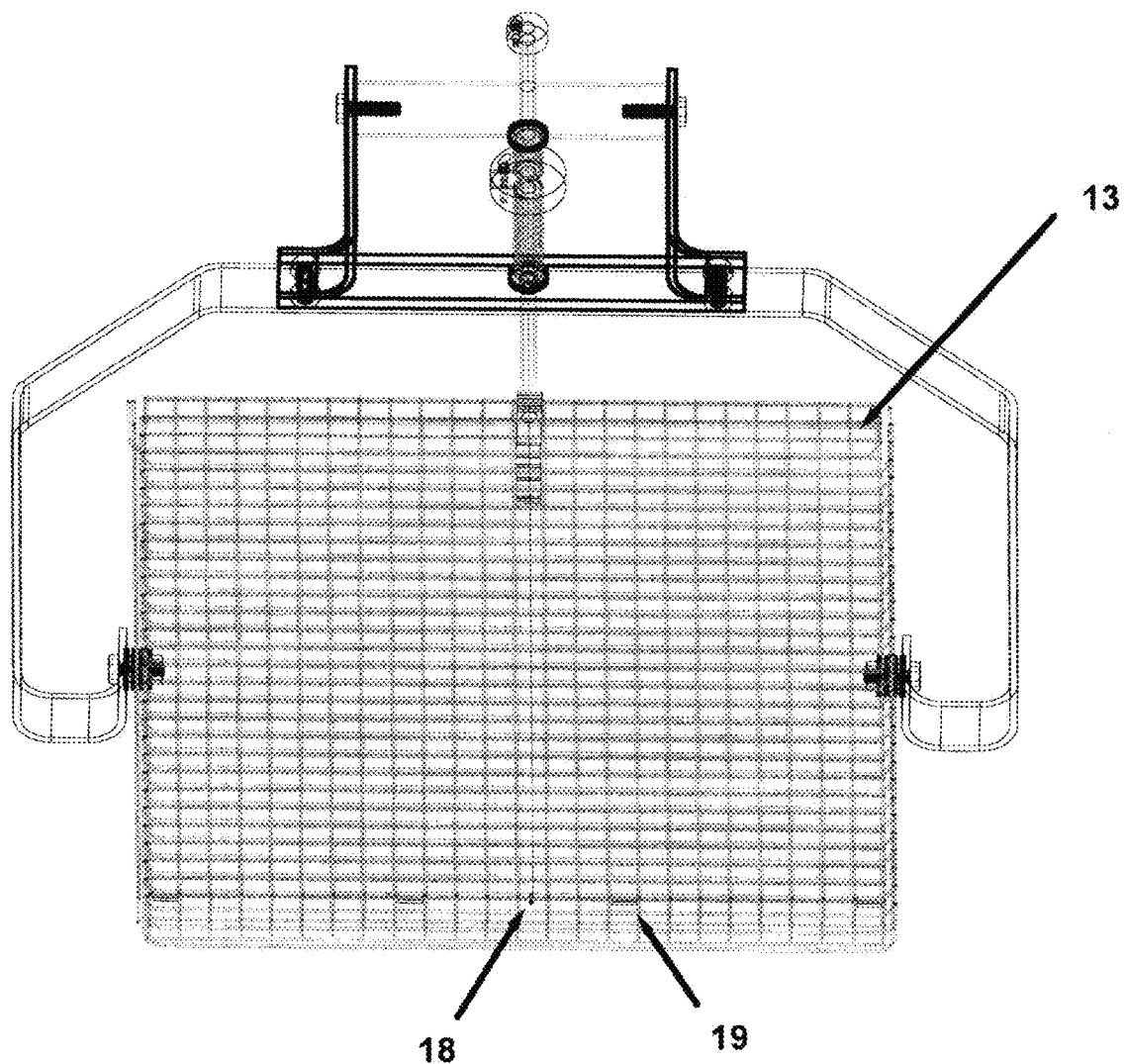
FIG. 5 is a distal end view of the griller with the two portions opened and away from each other at the front ends thereof.

FIG. 5 is an end view of the bottom of the food retainer, showing the junction of the top and bottom portion. Attention should simultaneously be directed to FIG. 8 which shows one of the several connectors 18 on the left of the figure, which are a food safe galvanized 16 gauge steel wire members called hog rings, and sold by DeWalt among other vendors. These hog rings 18 are applied using a special readily available, hog ring plier for crimping the rings. On the right of FIG. 8 is one hog ring ready to serve as a hinge when crimped, and also marked 18.

In order to prevent side-wise, that is lateral, movement of the top portion 13, relative to the bottom portion 15, a series of slack preventers, 19 have been designed to fit between adjacent wires of the hardware cloth. These prevent lateral movement of the top, relative to the bottom. Elements 19 are made of food grade stainless or galvanized steel and have an arcuate section on each end of a flat section. One arcuate section wraps around the last horizontal wire of the hardware cloth of the top portion and also around the adjacent wire from the bottom section, between a pair of spaced transverse wires of each of the top and bottom sections.

Figure 6A:
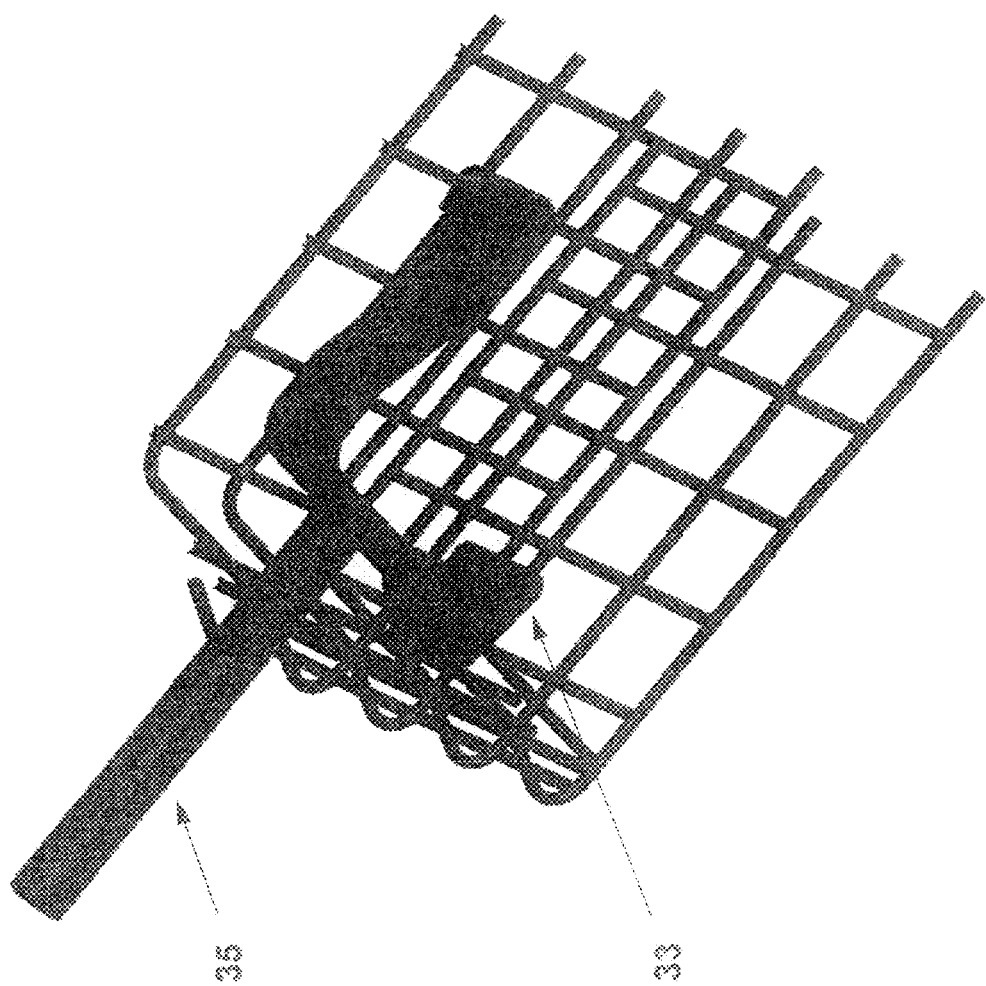
FIG. 6A and FIG. 6B are closeup views taken from the outside and inside of the bottom portion of the device, showing the latching member employed herein.
Figure 6B:
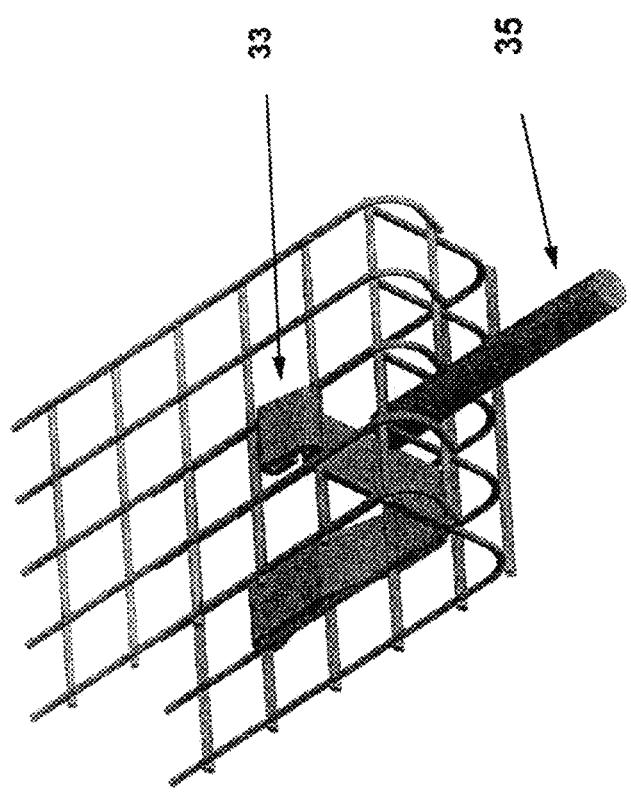

FIG. 6A and FIG. 6B are obverse and reverse views of the latch 33, shown mounted on the bottom portion of this device. Latch 33 is used to hold the open end of the top portion to the open end of the bottom portion, when and as the griller is to be employed on a barbecue grill. It is seen that this element is discussed in detail with respect to FIG. 12 where it is shown disposed for use, mounted on the bottom portion of the device.

The discussion turns now to FIG. 7, which is a closeup of the latching mechanism, part of the frame and the handle. Reference should also be made simultaneously to FIG. 14. Handle 27 is a wooden or heat resistant plastic dowel, preferably, with a central throughbore 29 that is preferably threaded for receipt of bolts 31, that are used to hold the handle to J-shaped frame members 24. The handle also has a transverse throughbore 57 sized to receive the rod 35 there through. Hex bolts 39 are driven through suitable bores 59 in J shaped member 24, into the handle 27's throughbore, on each side of he handle to hold the handle in place.

The two spaced and opposed J-shape members are bolted through the insulation member 23, which is sized width wise to correspond to the width of the frame member 21 and lengthwise to extend just beyond the end of each J shape member. Stainless steel bolts 25A and nuts 25B are used for this task. Silicone rubber is the preferred insulation material.

Rod 35 has a collar 37 at its proximal end held in place by a set screw 38. The rod passes through the transverse bore 57 in the handle that is purposely off center to help the user remember which side of the food has been cooked prior to turning the food over, should the user retain the food retainer in line with the frame, as opposed to normal thereto, for 360 degree rotation. The rod also passes through bore 60 in the insulation member. Off center positioning makes it easier to access the lower second collar 39' which is disposed between two coil springs, 36 and 40 to pull it toward the handle to disengage the rod from the food retainer and allow the food retainer to be rotated 180 degrees on the barbecue.

To be clear it is seen that the rod has three possible position locations, all of which are through the handle and insulation member. The first is the at rest position with the distal end located within the hardware cloth of the bottom portion of the food retainer, spaced away from the latch. The second position is the forwardly urged position, which is accomplished by pushing the proximal collar 37 to have the distal end of the rod make contact with the latch to undo or release the spring steel latch. The third position is accomplished by urging the second collar fixed to the rod, toward the handle. This removes the rod from the confines of the food retainer and allows the food retainer to rotate by gravity to a horizontal position when the griller is lifted from the barbecue. Since the food retainer is hingedly attached to the frame, pushing on the front end or the back end on the barbecue will cause the food retainer to rotate for grilling of the second side of the meat etc contents of the griller, without rotating the griller from left to right or right to left to grill the second side of the contents of the food retainer.

The discussion now turns to FIG. 14 wherein the frame 21 will be discussed. The frame 21 has a multiplicity of elements, all integrally connected into one frame. We commence at the lower open end of the frame, where a pair of spaced generally rectangular or square opposed flanges 21A, each sized similarly and each having a central throughbore 21B are in an upstanding disposition. Each flange 21A is connected to a generally horizontal section 21C which are disposed in a mirror image relationship, one left, one right, relative to the pair of flanges. Sections 21C each have a distal radiused end that connects to a generally vertical section 21DD. The two spaced sections 21D are respectively joined to a respective 45 degree canted section 21B, wherein the two sections 21B taper toward each other. Section 21F, a single section is joined to the terminii of each section 21E to form a free form inverted U shape structure 21.

In FIG. 8, which is a closeup view of the junction of the top section 13 and bottom section 15 of the food retainer 11. The top section is the flat section and the bottom having upstanding sides as was described supra. The two sections 13 and 15 are not joined by a physical hinge. Instead, a series of spaced connector rings, 18 are used for joining the last horizontal wire of the wire cloth sections together. In the drawing, the left connector ring 18 is engaged, while the connector ring on the right is seen to have been unwound purposely for the viewer to understand the structure being employed to connect section 13 to section 15. While only one such connector 18 is seen in the drawing, a plurality such as seven, spaced along the horizontal width of the griller connect the two sections. In order to prevent the movement of one section laterally with respect to the other food retainer section, at least a pair of spaced slack preventers 19 are employed spaced long the width of the distal interface of the two sections 13 and 15. Whereas coiled wound wire such as 14 gauge stainless steel wire is employed for element 18, the slack preventers 19 are strips of stain less steel wound around to overlap the edges, to form a flattened overlapped oval around the distal wire strand of the hardware cloth members that form the top and bottom sections of the food retainer, 11. These slack preventers 19, inhibit side to side movement of one food retainer section relative to the other food retainer section.

Figure 9:
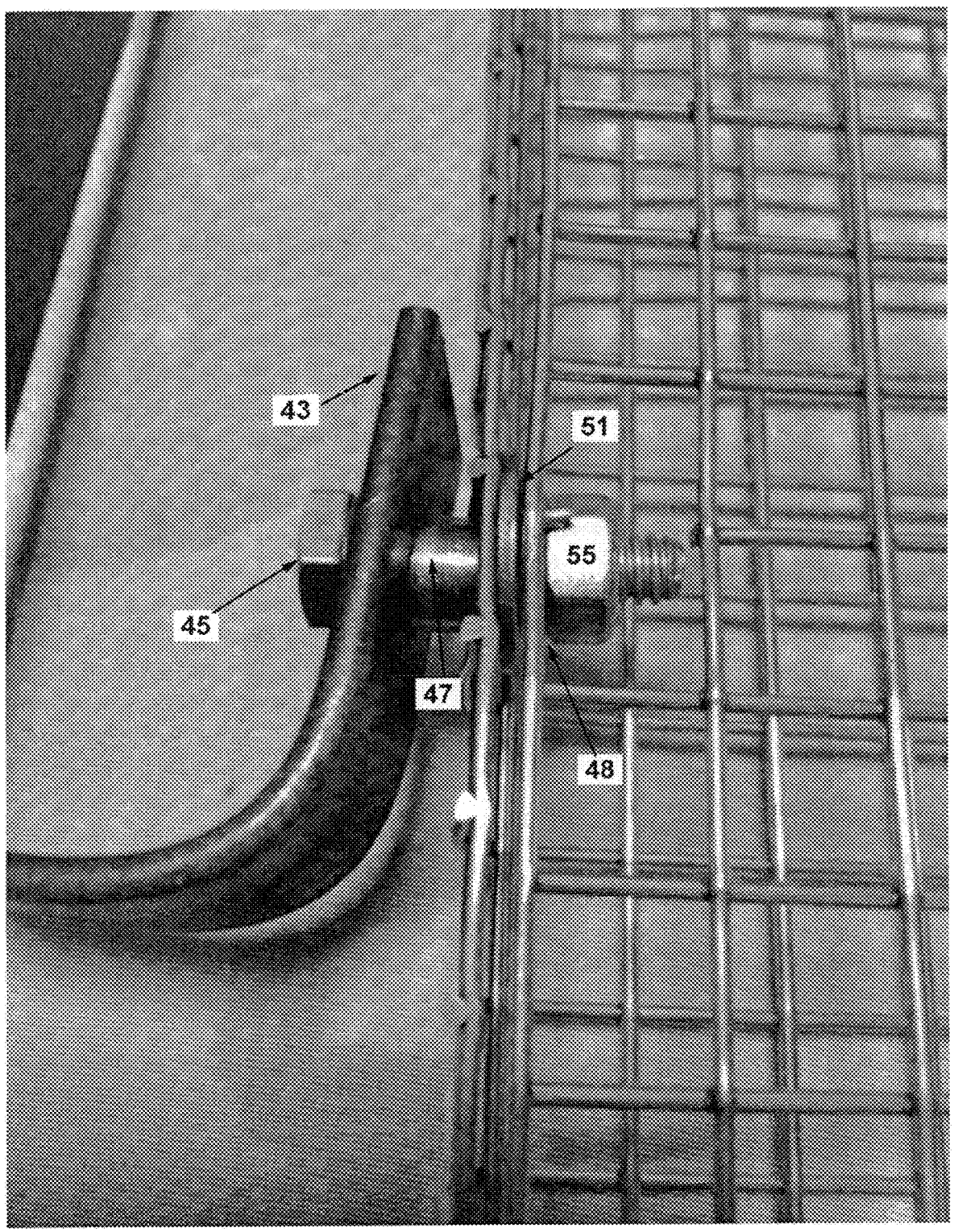
FIG. 9 is a closeup view of one of the two pivoting portions to permit rotation of the griller basket.

FIG. 9 is a closeup view of the frame to food retainer attachment assembly 43. There are two of these but only one is depicted in this drawing. Element 45 is a hex bolt of about 1.50 inches in length. Disposed adjacent the head of the bolt 45 is a bushing 47 that spaces the bolt head from the frame member 27A but which extends through the frame member 27A. Next disposed on the bolt threads is the food retainer. The bolt passes thorough an 22, unnumbered square opening adjacent to the marked opening 48. Next disposed on the interior of the food retainer 13, is a conventional metal washer 49, followed by a lock washer 51 and finally a conventional hex nut, 55. This series of components, allows the food retainer 11 to rotate a full 360 degrees as may be desired, when the latch mechanism 33 is released, by raising the lower collar 39 connected to the rod 35, upwardly but retaining the engagement of the releasable latch 33. The openings in the wire cloth of the food retainer are designated 48.

Figure 10:
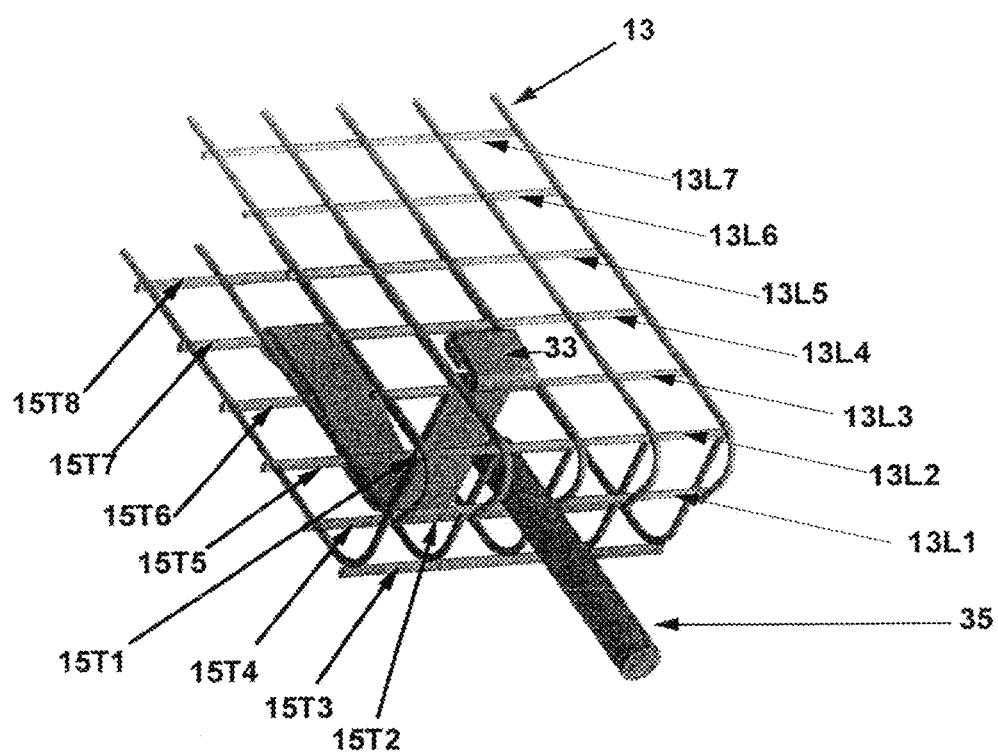
FIGS. 10 and 11 are both closeup views from opposite perspectives of the latching mechanism employed in this invention.
Figure 11:
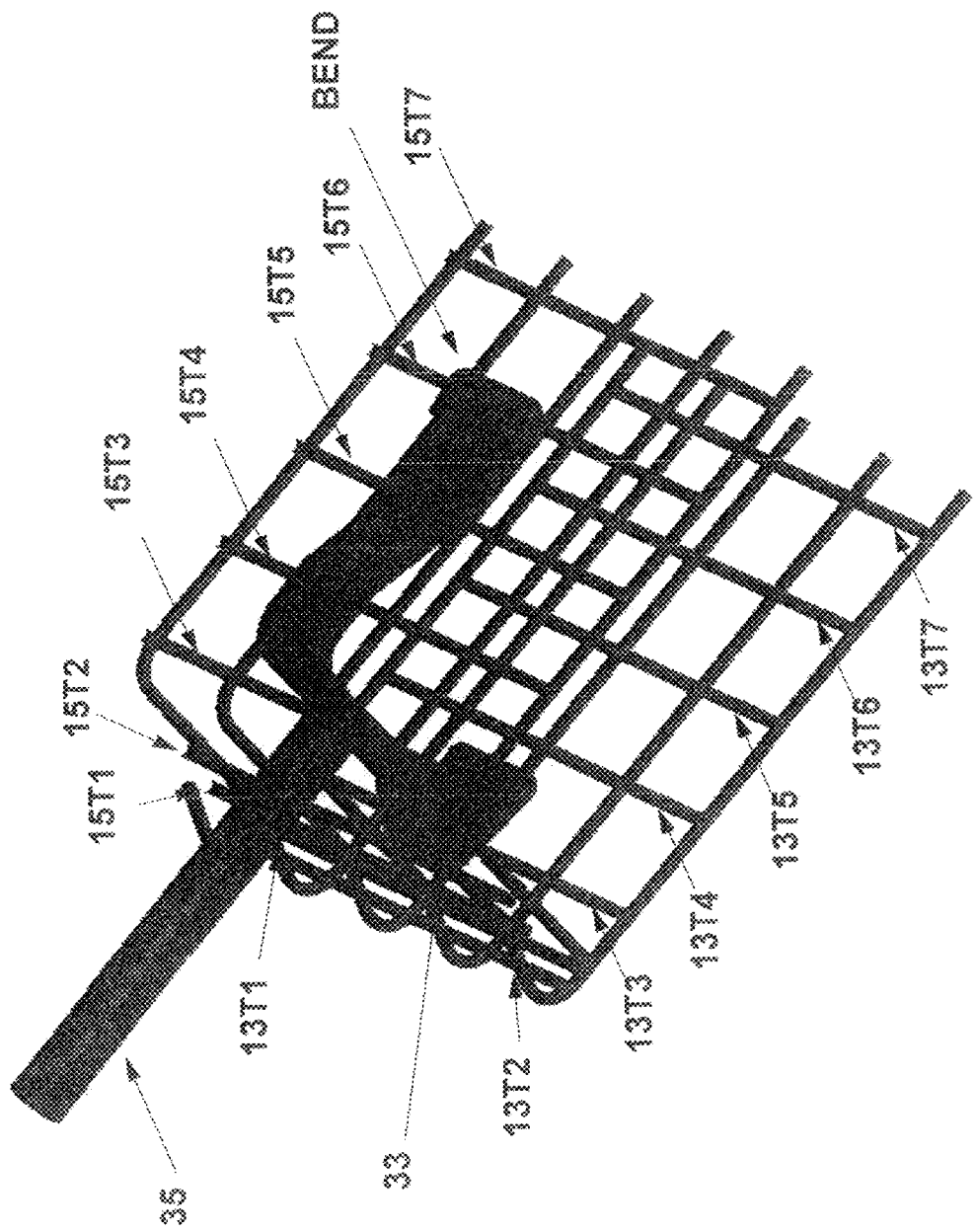

FIGS. 10 and 11 are opposing views of the elements. As can be seen in FIG. 10, the top section of the food retainer is depicted on the right side of the view, while the bottom section is shown vertically on the left side of the FIGURE. Rod 35 is seen to be impacting the latch mechanism 33.

Prior to discussing the various segments of the latch, it is important to understand certain aspects of the nomenclature being adapted for easy recognition of various elements shown in these two FIGURES. The material used used to manufacture the food retainer 11 of this invention is made of interconnected solid wire strands that are welded to each other at predesignated spacings which here are 0.5 inches. The material is defined as "½ inch openings square mesh welded stainless steel wire". Both the bottom of the food retainer 15, and the top 13, are seen to have transverse wire segments uniformly spaced apart in rows and welded to a series of spaced longitudinal wire segments. Only five of these bottom transverse wire segments are shown in each FIGURE and designated 15T1 through 15T 5 with the "T" representing transverse. Another name for the food retainer material is hardware cloth.

The top section of the food retainer 13 also has a series of transverse wire segments, spaced apart and welded to a series of spaced longitudinal wire segments. Here in FIG. the longitudinal wire segments are designated 13L1 through 13L7. FIG. 11 which is a reverse angle viewpoint of the content of FIG. 10.

Figure 12:
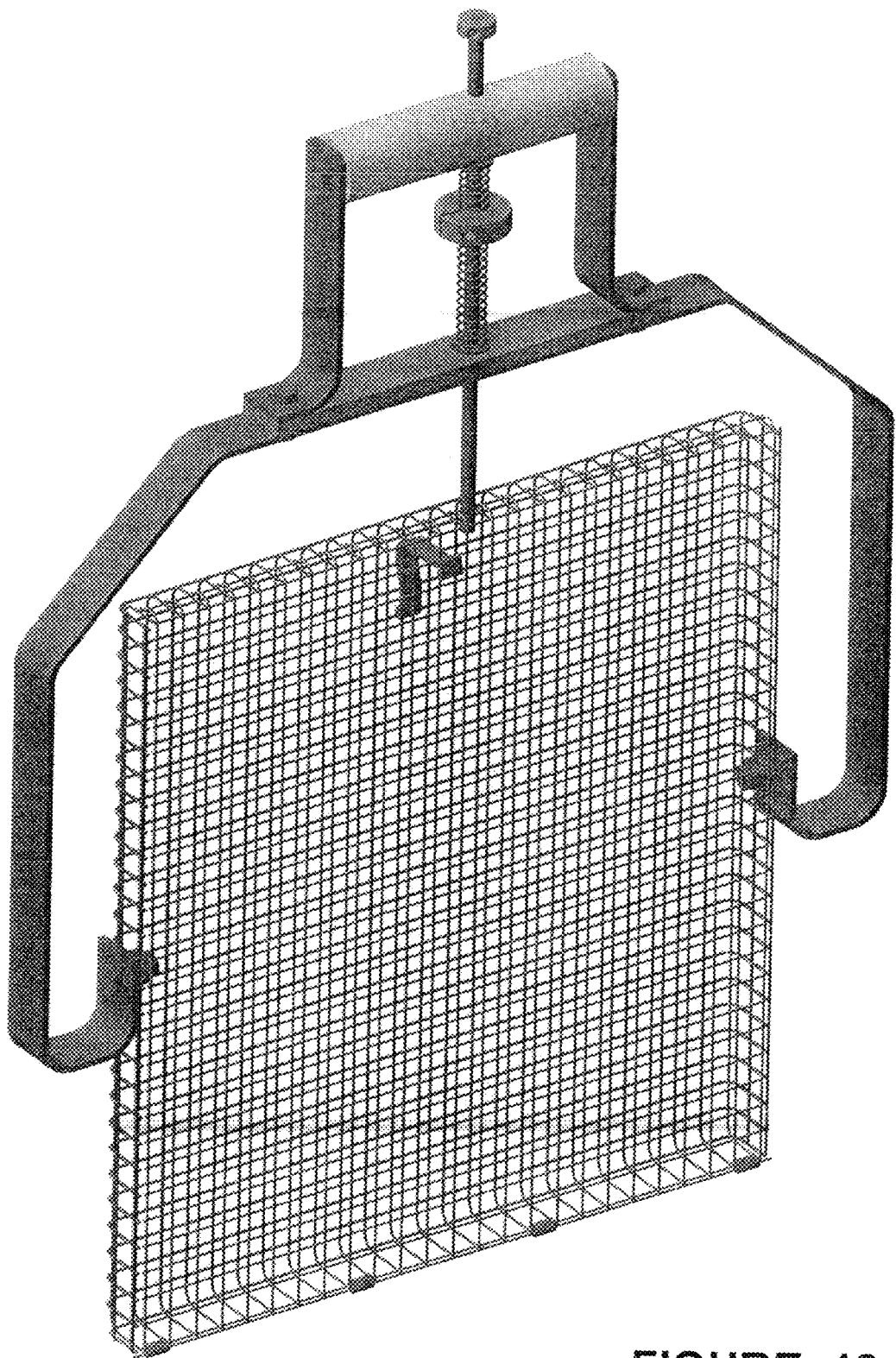
FIG. 12 is a mechanical drawing showing the two basket portions and the latch used to keep them closed together.

Reference is again made to both FIGS. 10 & 11 for discussion on the latch mechanism 33. Reference should also be made to FIG. 12 which is a side elevational drawing, and less detailed, and therefore easier to understand. The latch is a multi-segment bent piece of sheet spring stainless steel. The overall width of the element is about 0.5 inches. Of the ten segments, most carry the full designation, namely: 33A through 33K 0. This is strictly for simplicity and to prevent crowding in the FIGURE.

Latch 33 was also shown in FIGS. 6A and 6B. Here in these figures, the latch is seen disposed mounted onto the bottom portion of the food retainer, in its in-use position in FIGS. 10 and 11 as well as the closeup view of FIG. 12. Latch 33 per FIG. 12, comprises a series of bends in various directions of a single piece of flat stainless steel which is about ½ inch wide and about 1.45 inches in length from 33F to 33A and about 1.42 inches from 33 F to 33 H. The latch commences at segment which is a straight segment 33A, that is joined at its distal end to an arcuate segment 33B that wraps around transverse wire 15T6, The distal end of 33B is joined to section 33C which is joined at about a 130 degree angle to section 33D to form a widespread V-shaped portion. The junction of latch sections 33C and 33 D is disposed beneath wire 15T5. Section 33 D is joined to a section 33E which is flat and disposed over the top of wire 15T4, and lies parallel to the bottom 15 of the food retainer 11. Section 33E is joined at its distal end to an elbow 33F which in turn is joined at its distal end section 33G which is disposed normal to the front of the bottom portion 15 of food retainer 11. This base portion is designated 15BB for section 15 bottom base, while the front wall of same is designated 15BF for bottom front. See FIG. 11 as well. Section 33G terminates behind wire 13T3 and is joined to a second arcuate section 33H which is disposed outwardly relative to all previous sections mentioned of the latch 33. This section 33 H is integrated to a flat section 33 I that is disposed slightly downwardly relative to the top of the food retainer 13. This slight downward disposition is needed to accommodate the next section 33J, an elbow which is joined to terminal section 33K that is disposed over the top portion of the food retainer 13. The terminus of section 33K is just below that of section 33G. See FIG. 12.

As can be seen in FIG. 12, sections G & H of latch 3 hold wire 13T3 secure such that the two portions of the food retainer do NOT separate unless and until the rod 35 pushes the latch rightwardly in this FIGURE, to in essence release wire 13T3 from the grasp of the latch such that the two portions of the food retainer 11 can separate. Thus in the at-rest position of the latch, the two portions of the food retainer, 13 and 15 are held together and the food retainer portions are in a closed relationship. Only when the rod is urged forwardly to disengage the latch from the top portion do the two portions become separable.

Figure 13:
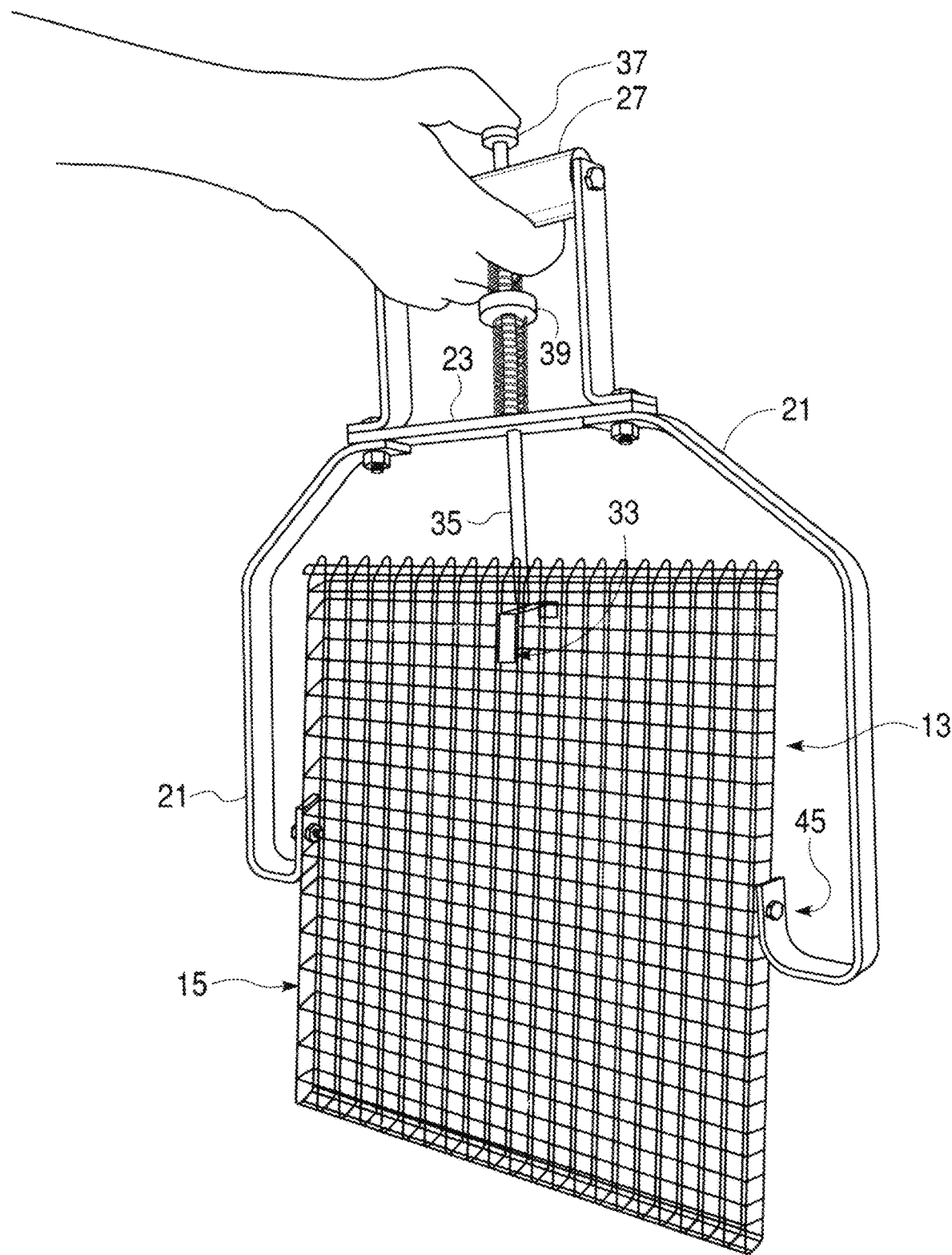
FIG. 13 is a perspective view of an operator's hand in the process of opening the basket.

The discussion moves to FIG. 13 which relates to the act of unlatching of the food retainer 11. Notice the position of the hand of the user. Place the thumb on the upper member 37 and hold the handle. Exercise a downward motion to move the rod to disengage the latch, which will take place upon impact of the bottom tip of the rod 35 with the latch 33. Note that collar 39, held in position by set screw 38 is strategically placed between the two springs 36, such that the rod will return to its neutral position upon cessation of the urging downward to undo the latch 33. A washer 40 may be placed on the rod above the upper spring to maintain the integrity of the spring from directly hitting the handle on its return trip upward. A similar washer may be placed on the rod beneath the lower spring at the point of the insulator 23.

To re-engage the rod in its neutral position within the bottom portion 15, place several fingers under lower collar 39' (which is held in position by set screw 38') and pull upwards The top portion 13 can be manually overlaid onto bottom portion 15, the combined food retainer 15 can then be aligned with the rod 25 and the fingers can be removed from collar 30' such that the rod re-enters the opening in the bottom portion where the two portions of the retainer have been mated. Note specifically that the rod is preferably positioned off center to portions provide more room for the user's hand to operate the rod.

Next to be discussed in detail is FIG. 14, an exploded view of the instant device and primarily, which view relates to the frame, 21. Basically the frame is a multi-segmented unit formed of two mirror image opposed portions having segments A through E both connected on opposite ends to an intermediate horizontal portion, 21F.

The entire frame is made from bent bar metal stock about ⅛th inch to ³⁄₁₆th inch thick and about 1.00 to 1.50. Inches wide. The frame may be made of ordinary flat bar steel or aluminum alloy. For durability and aesthetics, a high heat/high gloss paint for metal was applied by spraying, though dipping would work as well.

Starting at the bottom, on each side, segment 21A is an upstanding portion about 1.5 inches in elevation, which has a throughbore 21B therein. Each segment 21A is connected to a generally horizontal segment 21C via a radiused connection, Segment 21C is about 2" inches long. Each segment 21C extends outward away at its first end from the spaced upstanding segments 21A.

Segment 21C is connected at its second end at about a 90 degree angle to a generally vertical segment 21D at 21D's first end. Segment 21D is about 8 inches in elevation. The second end or distal end of each 21D is radiusedly connected to the first end of a 45 degree inwardly directed segment 21E, which 21E is about eight inches in length. The second end of each segment 21E is connected at opposite ends of a horizontal segment 21F which is also about eight inches in length. The frame may, and preferably is, formed from a single metal member bent as needed in a brake.

As can be seen, a solid preferably high heat resistant insulator 23, such as silicone rubber is disposed on top of frame segment 21F and is held in place by appropriate bolts and nuts—21 A & 21B placed through spaced and opposed mirror image situated J shape members 24, The two J shaped members 24 extend horizontally about one inch and vertically about five inches. Any suitable non-rusting steel may be employed or a suitable aluminum alloy can also be used for these elements.

Handle 27 which may be made of wood or a heat resistant plastic is connected at the distal end of each J shaped member, via through bores 59 at the terminus of each respective J shaped member. A hex bolt 31 is used to pass through bore 59 to engage internal threads 21 shown in dashed lines in said handle. See FIG. 7.

The discussion now turns to the question of why does the inventor of this device refers to it as the Griller 360? A review of the Figures shows that the griller can be carried from kitchen to barbecue with the food retainer in either a vertical or horizontal disposition. This is up to the desires and perhaps physical size of the user.

To load the griller, align the rod with the latch and then push the rod downwardly to disengage the latch Manually move the top portion upward and load the contents as desired. Then manually close the top portion over the bottom portion and engage the latch.

If the griller is fully loaded so that articles such as meat or fish steaks are placed edge to edge, the device may be carried vertically. However, if only one or two hamburgers or 1 pork chon are in the device, then is preferable, to carry it with the food retainer horizontal, so that the contents remain where they were originally placed.

When the person carrying the device approaches the grill, carrying the device with the food retainer vertical, one merely rotates his/her hand to place the food retainer onto the grill. To grill the second side of the contents, the user merely flips the retainer or rotates the food retainer 180 degrees as with any other grilling basket.

When the griller is carried with the food retainer in a horizontal disposition, the food retainer is laid on the grill, and the handle moved in a downwardly direction while the food retainer stays on the barbecue in a latched condition. After the first side of the contents is cooked (heated) the food retainer while still latched is lifted slightly off the barbecue surface and rotated on its axis per FIG. 9 such that the second surface of the retainer having the uncooked side of the contents now facing the heat. The use of a pot holder to do so to avoid burning one's hand is recommended.

To gain access to the contents of the griller, the griller is held with the top portion facing flat on the plate or serving area. The rod is pushed downward vertically to engage the latch and thus release the latch from its engaged position. Disengage the latch and the top portion will fall to or remain on the plate or serving area exposing the contents while the bottom portion is raised away from the top portion. Using a spatula or other barbecue tools remove the meat/fish/vegetables from the food retainer. Reload the top portion of the device with more food, overlay the top portion and use the rod to re-engage the two portions of the food retainer.

Loading, Cooking and Cleaning

Prepare your meats and poultry and vegetables as you would for grilling with the desired seasonings. Care should be taken to try to utilize proteins and vegetables of substantially the same thickness to avoid individual items from sliding around in the food retainer, 11. Since the product of this invention is available in various elevations, choose the elevation most suitable for your items be they chicken breasts, porterhouse steaks, or zucchini sections. By utilizing the same thickness for all items, uniform cooking will transpire. Feel free to mix and match items provided that they are all about the same thickness and hopefully require the same cooking time. If cooking time varies it may be necessary to unload certain food items earlier than the rest of the items in the food retainer.

Close and secure the top of the retainer to the bottom of the food retainer. Check that the two sections are engaged prior to walking to the grill with the food.

Place the griller onto the grid of your charcoal, or propane barbecue, or on a wood stove, kitchen interior electric grill or other cooking medium. Proper even heating of the contents of the retainer is obtained on both sides of the food item by rotation of the food retainer by pulling on the handle toward you, tipping the unit on its rear edge and rotating the food retainer forward to apply heat to the reverse side of the contents of the retainer. No need to lift the heavy unit, nor to twist and rotate one's arm to be able to achieve two sided cooking. The primary reason to rotate the food retainer is that the rear of almost all grills is hotter than the front, which is closer to ambient air, So by rotating the Food retainer 360 degrees, the food that was in the front, moves to the rear of the grill when the food retainer is inverted.

Cleanup is simple since the food retainer is stainless steel it can be cleaned using a Scrub Daddy® scrubbing sponge, or a bristle brush, using warm soapy water, or the entire unit can be put into a household dishwasher since the unit is made of stainless steel and the insulator is dishwasher safe.

While primarily intended for use with a natural gas or propane and charcoal barbecue grills, no reason is seen why this device can not be used on a gas operated cook top or stove.

With proper use and care the product of this invention should serve the user for many years of happy grilling.

Since certain changes may be made in the described apparatus without departing from the scope of the invention herein involved, it is intended that all matter contained in the above description and shown in the accompanying drawings shall be interpreted as illustrative and not in a limiting sense

I claim:

1. A griller for use on a barbecue which griller has an inverted generally U-shape frame with a handle thereon, wherein the handle is spaced from the frame and is attached to opposed J-shaped members, said J-shaped members being attached to the frame through an insulation member,
    said frame rotatably attached to a food retainer comprising a rectangular/square top hardware cloth portion hinged to a rectangular/square bottom hardware cloth portion, the bottom portion of which has side walls, said frame attachment being at about the midpoint of said food retainer's bottom portion's side walls, the top portion being releasably unlatchable to the bottom portion at an end opposite the hinged end to keep the food retainer selectively closed;
    a latching mechanism, comprising a latch and a rod that passes through the handle and frame to release said latch which is mounted on the bottom section of the food retainer, and when the latching mechanism is released, the two portions of the griller are separated and any contents become accessible.

2. The griller of claim 1 wherein the rod is normally at rest within the bottom portion of the food retainer, spaced from said latch, which rod is spring loaded to return it to a position still within the confines of the bottom portion of the food retainer after unlatching whereby when the top section is laid flat on a surface the bottom section can be moved away from the top section such that any therein food can be accessed on the top section for removal.

3. The griller of claim 2 wherein the frame includes opposed flanges that are attached through the hardware cloth of the bottom section of the food retainer by a means comprising bolts, and wherein the rod has a first collar attached at one end thereof distant from the latch, and a second collar is disposed on said rod between two coil springs, the disposition being at a location between the handle and the insulation member.

4. A griller for use on a barbecue which griller has a metal frame comprising a horizontal member integrally connected to spaced vertical sections, each vertical section being spaced from a food retainer, and each vertical section having a horizontal section, extending inwardly therefrom toward said food retainer, to a respective bored vertical flange directionally aligned and spaced from said respective vertical section, each said flange being rotatably attached to said food retainer,
    a dowel handle mounted between opposed spaced J-shaped members on each end of said handle which J-shaped members are attached to said frame;
    said food retainer comprising a rectangular/square top hardware cloth portion hinged to a rectangular/square bottom hardware cloth portion, the bottom portion of which has side walls, and front and rear walls and the top portion has a flat section and a front lip normal to said flat section, said front lip overlying the front wall of said bottom portion,
    the said food retainer's portions being hinged to each other on a first end of the bottom portion and at the end of the top portion distant from said lip,
    a rod passing through the handle and said horizontal member of said frame spaced from a latch, adapted to releasably unlatch the latch disposed on said food retainer, that holds the two portions of the food retainer in a closed relationship.

5. The griller of claim 4 wherein the hinging of the two portions of the food retainer comprises hog rings attached to the bottom portion and the top portion of the food retainer,
    the J-shaped members are attached to the frame through an insulation member disposed on the frame's horizontal member to protects a user's hand from heat, and
    the rod is disposed off center relative to the handle and a silicone rubber insulation member, and said rod has a pair of spaced collars, one of which is disposed between two coil spring at a location between the handle and the silicone rubber insulation member.

6. The griller of claim 4 wherein the rod is normally at rest within the bottom portion of the food retainer, spaced from said latch, and which rod when urged away from its confinement within the bottom portion of said food retainer, while retaining the latched condition permits rotation of the food retainer 180 degrees on a barbecue.

7. The griller of claim 4 wherein the handle is a wood dowel, and the insulation member is silicone rubber and the food retainer is made of hardware cloth.

8. A griller for use on a barbecue which griller has an inverted generally U-shaped frame with a handle thereon, said frame pivotally attached to a food retainer, said food retainer comprising a top portion hinged to a bottom portion at a hinged end, the top portion being releasably unlatchable to the bottom portion at an end opposite the hinged end to keep the food retainer selectively closed;
    a latching mechanism, comprising a latch disposed in the bottom portion which bottom portion is hingedly connected to the top portion of said food retainer and a spring loaded rod that passes through the handle and frame adapted to release said latch, and when the latching mechanism is released, the two portions of the griller are separated and any therein contents become accessible,
    wherein the handle is spaced from the frame and is attached to opposed J-shaped members which in turn are attached to the frame and
    wherein the food retainer is made of wire mesh for the top portion and the bottom portion, and wherein the bottom portion has a flat rectangular main section and four upstanding spaced sections, front, back and two sides, the sides, being normal to the front and back,
    and the top portion has a flat rectangular first section with a downward extending front lip that is directed to overlie the bottom portion's front section.

9. In the griller of claim 8 wherein the food retainer's two portion are hinged together by hog rings and the food retainer is made of hardware cloth.

10. A griller for use on a barbecue which griller has a metal frame comprising a horizontal member integrally connected to spaced vertical sections, each vertical section being spaced from a food retainer, and each vertical section having a horizontal section, extending inwardly therefrom toward said food retainer, to a bored vertical flange directionally aligned and spaced from said respective vertical section, each said flange being rotatably attached to said food retainer,
- a handle attached to opposed J-shaped members on said frame, and
- a rod passing through the handle and said horizontal member of said frame to releasably unlatch a latch disposed on said food retainer, which food retainer comprises two hinged together portions, a top portion and a bottom portion, the top portion overlying the bottom portion at the non-hinged end,
- wherein the rod has a first collar at its proximal end, and a second collar disposed between two coil springs, at a location between the handle and the horizontal member of the frame and wherein the rod is disposed off center along the handle and frame to facilitate access to said second collar for movement toward said handle to disengage the rod from the food retainer, for rotation of the food retainer,
- said handle selected from the group consisting of wood and heat resistant plastic.

\* \* \* \* \*